United States Patent
Park et al.

(10) Patent No.: US 8,271,820 B2
(45) Date of Patent: Sep. 18, 2012

(54) MICRO-PROCESSOR

(75) Inventors: Ie-Ryung Park, Gwangju (KR);
Dong-Soo Har, Gwangju (KR); Yousaf Zafar, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 637 days.

(21) Appl. No.: 12/482,852

(22) Filed: Jun. 11, 2009

(65) Prior Publication Data

US 2010/0274996 A1 Oct. 28, 2010

(30) Foreign Application Priority Data

Apr. 23, 2009 (KR) .................. 10-2009-0035653

(51) Int. Cl.
*G06F 1/00* (2006.01)

(52) U.S. Cl. ........................... 713/330; 713/500
(58) Field of Classification Search .................. 713/500, 713/300–340
See application file for complete search history.

(56) References Cited

U.S. PATENT DOCUMENTS

| | | | | |
|---|---|---|---|---|
| 4,365,311 A | * | 12/1982 | Fukunaga et al. | 713/500 |
| 4,760,519 A | * | 7/1988 | Papworth et al. | 712/217 |
| 4,789,925 A | * | 12/1988 | Lahti | 712/7 |
| 4,896,259 A | * | 1/1990 | Jacobs et al. | 711/155 |
| 5,006,980 A | * | 4/1991 | Sanders et al. | 712/219 |
| 5,394,529 A | * | 2/1995 | Brown et al. | 712/240 |
| 5,459,843 A | * | 10/1995 | Davis et al. | 712/23 |
| 5,555,384 A | * | 9/1996 | Roberts et al. | 712/216 |
| 5,559,975 A | * | 9/1996 | Christie et al. | 712/230 |
| 5,632,023 A | * | 5/1997 | White et al. | 712/218 |
| 5,640,588 A | * | 6/1997 | Vegesna et al. | 712/23 |
| 5,692,170 A | * | 11/1997 | Isaman | 712/244 |
| 6,427,205 B1 | * | 7/2002 | Mori et al. | 712/226 |

FOREIGN PATENT DOCUMENTS

KR 10-0324253 1/2002

* cited by examiner

*Primary Examiner* — Paul R Myers

(57) ABSTRACT

A micro-processor includes a clock generator configured to generate a fetch clock, a decoding clock, an execution clock, and a write-back clock that are sequentially enabled; a volatile memory device configured to output pre-stored program data in response to the fetch clock; a command decoder configured to decode the program data in response to the decoding clock and generate a decoding command; an arithmetic device configured to perform an arithmetic operation according to the command of the decoding command in response to the execution clock; and a peripheral circuit device configured to be operated according to the command of the decoding command in response to the write-back clock.

16 Claims, 3 Drawing Sheets

MICRO-PROCESSOR

CROSS-REFERENCES TO RELATED PATENT APPLICATION

The present application claims priority under 35 U.S.C 119(a) to Korean Application No. 10-2009-0035653, filed on Apr. 23, 2009, in the Korean Intellectual Property Office, the disclosure of which is incorporated herein by reference in its entirety as set forth in full.

BACKGROUND

1. Technical Field

The present invention relates to a semiconductor device, and more particularly, to a micro-processor.

2. Related Art

A conventional micro-processor is operated to repetitively perform basic processes consisting of four steps such as fetch, decoding, execution, and write-back. For this, the micro-processor includes a clock generator and performs the steps, such as the fetch, decoding, execution, and write-back, for each rising edge of a system clock that is generated from the clock generator. That is, the processes are performed using four periods of the system clock as one unit.

The micro-processor moves program data input in a program input device to at an initial operation a memory device and stores the program data in the memory device. Thereafter, when the system clock is activated, the micro-processor activates transmits the program data stored in the memory device to a command decoder in the fetch step. In the decoding step, the micro-processor activates the command decoder, and decodes data transmitted from the memory device. In the execution step, the micro-processor activates an arithmetic device, and performs an arithmetic operation on signals transmitted from the command decoder according to each command. In the write-back step, the micro-processor activates a register and a peripheral circuit device, and stores arithmetic results by the arithmetic device or performs a communication operation with the outside, a counting operation, etc., according to each command transmitted from the command decoder.

In the technical development of the micro-processor, low power implementation has been recently highlighted as the most important issue. This is because a demand of a low power micro-processor is increased due to devices, such as mobile communication devices, etc., that are sensitive to power consumption. Therefore, a study to reduce power consumption such as leakage current in each circuit area of the micro-processor has been actively progressed.

However, the micro-processor according to the related art is configured so that all the circuit areas are operated by the system clock. Therefore, the circuit areas, which do not perform the real operations, are activated, thereby consuming current. In addition, since the micro-processor is operated so that the program data is stored in a non-volatile memory device that consumes a large amount of current and has a limited operational speed and reads the stored program data from the non-volatile memory device, it is difficult to technically implement a low-power and high-speed micro-processor.

SUMMARY

Aspects of the present invention provide a micro-processor that is applied for a low power and a high-speed operational environment.

In one aspect, a micro-processor includes a clock generator configured to generate a fetch clock, a decoding clock, an execution clock, and a write-back clock that are sequentially enabled; a volatile memory device configured to output pre-stored program data in response to the fetch clock; a command decoder configured to decode the program data in response to the decoding clock and generate a decoding command; an arithmetic device configured to perform an arithmetic operation according to the command of the decoding command in response to the execution clock; and a peripheral circuit device configured to be operated according to the command of the decoding command in response to the write-back clock.

In another aspect, a micro-processor includes a clock generator configured to generate a fetch clock, a decoding clock, an execution clock, and a write-back clock that are sequentially enabled; an enable controller configured to generate a chip enable signal using the write-back clock; a volatile memory device configured to be activated in response to the chip enable signal and output pre-stored program data when the fetch clock is enabled; and a command decoder configured to decode the program data in response to the decoding clock.

In still another aspect, a micro-processor includes a data dumping device configured to transmit program data, which is pre-stored in a non-volatile memory device, to a volatile memory device in response to a power on reset signal and enable an initial operation end signal when the transmission operation ends; a command decoder configured to generate a decoding command by decoding the program data transmitted from the volatile memory device when the initial operation end signal is enabled; an arithmetic device configured to perform an arithmetic operation according to the command of the decoding command when the initial operation end signal is enabled; and a peripheral circuit device configured to be operated according to the command of the decoding command when the initial operation end signal is enabled.

These and other features, aspects, and embodiments are described below in the period "Detailed Description."

BRIEF DESCRIPTION OF THE DRAWINGS

Features, aspects, and embodiments are described in conjunction with the attached drawings, in which.

DETAILED DESCRIPTION

Hereinafter, the preferred embodiments will be described in detail with reference to the accompanying drawings.

Figure 1:
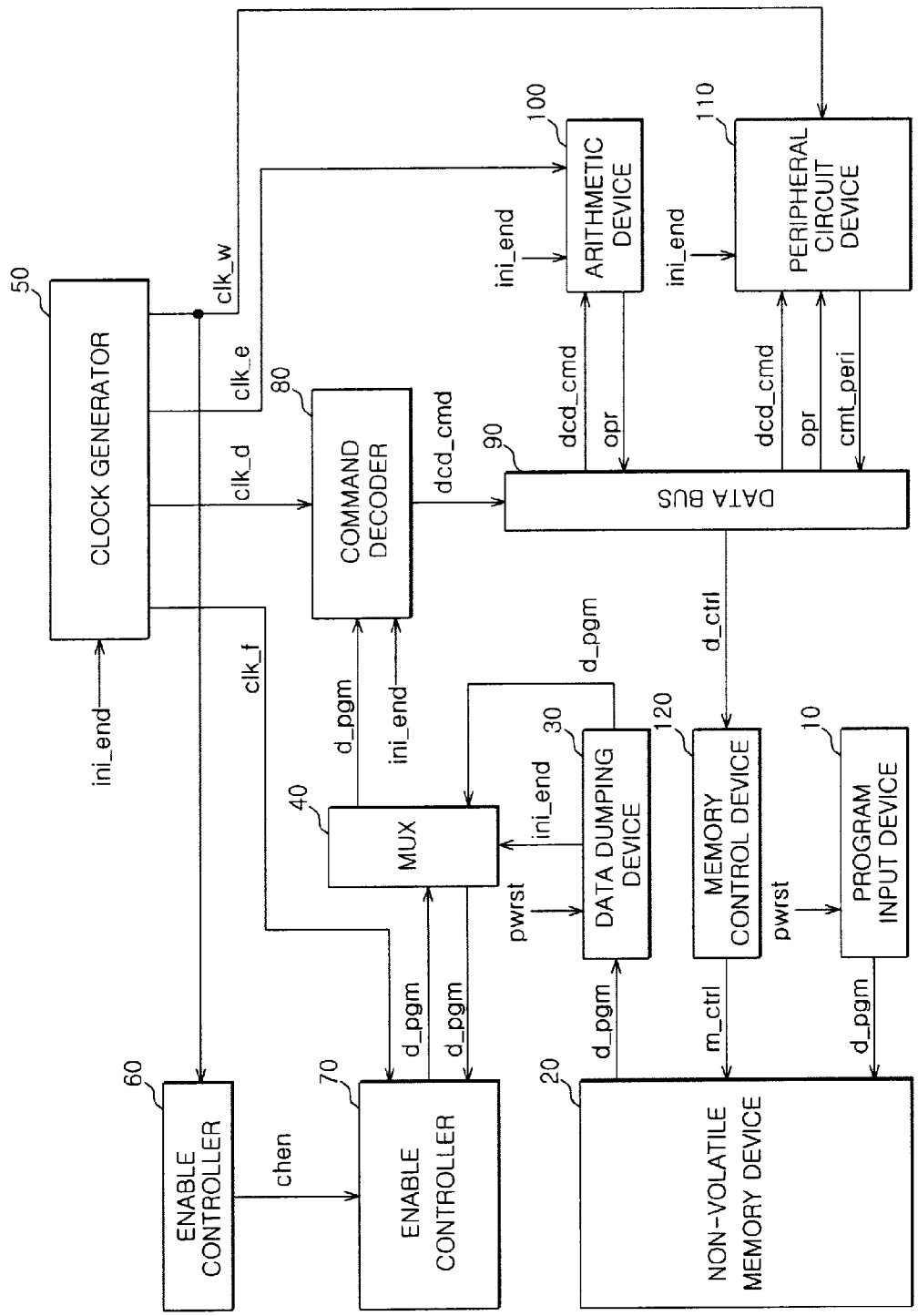
FIG. 1 is a block diagram showing a configuration of a micro-processor according to one embodiment.

FIG. 1 is a block diagram of a configuration of a micro-processor according to one embodiment.

As shown in the figure, the micro-processor can include a program input device 10, a non-volatile memory device 20, a data dumping device 30, a multiplexer (MUX) 40, a clock generator 50, an enable controller 60, a volatile memory device 70, a command decoder 80, a data bus 90, an arithmetic device 100, a peripheral circuit device 110, and a memory controller 120.

The program input device 10 stores a program data 'd_pgm' that is received from a user. Thereafter, the program input device 10 transmits the program data 'd_pgm' to the non-volatile memory device 20 when the operation of the micro-processor starts and a power on reset signal 'pwrst' is enabled. The non-volatile memory device 20 sequentially stores the program data 'd_pgm' in each address and then, sequentially outputs it to the data dumping device 30.

The data dumping device 30 sequentially transmits the program data 'd_pgm" to the volatile memory device 70 in response to the power on reset signal 'pwrst'. The data dumping device 30 generates an initial operation end signal 'ini_end' for defining an initial operational period of the micro-processor. The data dumping device enables the initial operation end signal 'ini_end' when the operation of transmitting the program data 'd_pgm' to the volatile memory device 70 ends. The data dumping device 30 that performs the operation can be easily implemented by those skilled in the art.

The multiplexer 40 provided between the data dumping device 30 and the volatile memory device 70 transmits the program data 'd_pgm' output from the data dumping device 30 to the non-volatile memory device 40 when the initial operation end signal 'ini_end" is disabled. On the contrary, the multiplexer 40 transmits the program data 'd_pgm' output from the volatile memory device 70 to the command decoder 80 when the initial operation end signal 'ini-end' is enabled.

The clock generator 50 generates the fetch clock 'clk_f', the decoding clock 'clk_d', the execution clock 'clk_e', and the write-back clock 'clk_w' that are sequentially enabled. The clocks output from the clock generator 50 are implemented as a form of a pulse signal having an enable period corresponding to one cycle of a general system clock.

The enable controller 60 receives the write-back clock 'clk_w' to generate a chip enable signal 'chen'. A configuration of the enable controller 60 can be easily implemented using a general inverting delayer.

The volatile memory device 70 includes a chip enable terminal and receives the chip enable signal 'chen' therethrough. The volatile memory device 70 is activated when the chip enable signal 'chen' is enabled and sequentially transmits the pre-stored program data 'd_pgm' to the command decoder 80 when the fetch clock 'clk_f' is enabled.

The command decoder 80 decodes the program data 'd_pgm' when the decoding clock 'clk_d' is enabled to generate the decoding command 'cmd_dcd' and output it to the data bus 90. The arithmetic device 100 is activated when the execution clock 'clk_e' is enabled. When the decoding command 'cmd_dcd' transmitted through the data bus 90 commands an arithmetic operation on any data, the arithmetic device 100 performs the arithmetic operation according to the command to output the arithmetic result 'opr' to the data bus 90.

The peripheral circuit device 110 includes circuits that stores the operation result 'opr', counter circuits for defining any operational period, and circuits for performing a communication operation with the external devices. The peripheral circuit device 110 is activated when the write-back clock 'clk_w' is enabled and performs an operation commanded by the decoding command 'cmd_dcd' transmitted through the data bus 90. The peripheral circuit device 110 can transmit a signal 'cmt_peri' input when it communicates with the external devices to the data bus 90.

The data bus 90 is used as a transmitting/receiving path for the decoding command 'cmd_dcd', the operation result 'opr', and the signal 'cmt_peri'. Meanwhile, the data bus 90 transmits a data control signal 'd_ctrl' included in the decoding command 'cmd_dcd' to the memory controller 120.

The memory controller 120 generates the memory control signal 'm_ctrl' in response to the data control signal 'd_ctrl' to control the operation of the non-volatile memory device 20. The non-volatile memory device 20 can change the input/output operation of the program data 'd_pgm' according to the control of the memory control signal 'm_ctrl'.

As described above, in the micro-processor according to one embodiment of the present invention, the clock generator 50 generates four clocks, that is, the fetch clock 'clk_f', the decoding clock 'clk_d', the execution clock 'clk_e' and the write-back clock 'clk_w' that are sequentially enabled. And, the clock generator 50 transmits the fetch clock 'clk_f' to the volatile memory device 70 operated in the fetch step, transmits the decoding clock 'clk_d' to the command decoder 80 operated in the decoding step, transmits the execution clock 'clk_e' to the arithmetic device 100 operated in the execution step, and transmits the write-back clock 'clk_w' to the peripheral circuit device 110 operated in the write-back step. Therefore, each circuit area of the micro-processor is activated only in necessary steps and is non-activated in unnecessary steps, thereby making it possible to prevent unnecessary power consumption.

Figure 2:
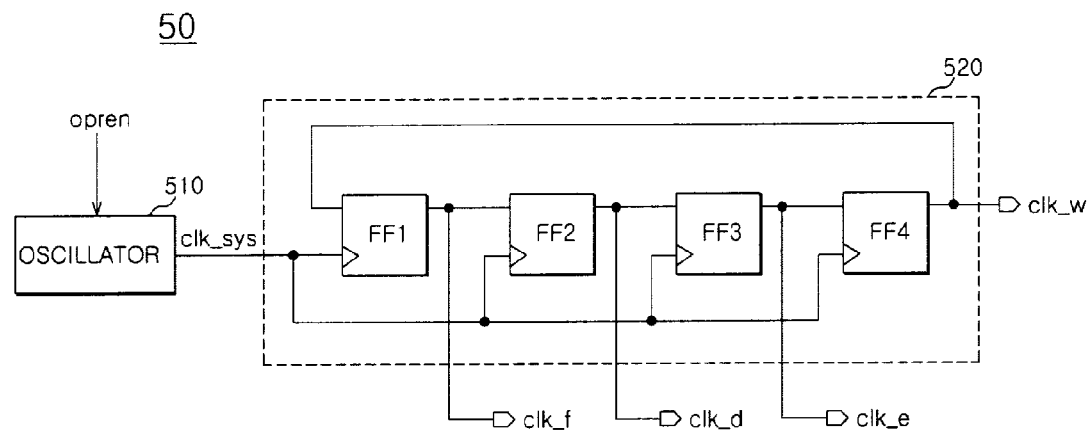
FIG. 2 is a configuration diagram of a clock generator shown in FIG. 1.

FIG. 2 is a configuration diagram of the clock generator shown in FIG. 1.

As shown in the figure, the clock generator 50 can include an oscillator 510 and a shifter 520.

The oscillator 510 performs the oscillating operation in response to the initial operation end signal 'ini_end' to generate the system clock 'clk_sys'. The shifter 520 shifts each rising edge of the system clock 'clk_sys' to sequentially enable the fetch clock 'clk_f', the decoding clock 'clk_d', the execution clock 'clk_e', and the write-back clock 'clk_w'.

Herein, the system clock 'clk_sys' can be considered as the same one as the system clock used in the conventional micro-processor. The clock generator 50 of the embodiment further includes the shifter 520, such that it can generate the fetch clock 'clk_f' the decoding clock 'clk_d', the execution clock 'clk_e', and the write-back clock 'clk_w'. As shown, the shifter 520 can be easily implemented using four flip-flops 'FF1 to FF4' connected in series that perform each latch operation in response to the system clock 'clk_sys'. Herein, any one of the four flip-flops 'FF1 to FF4' should latch a logic value having a high level at the initial operation.

Figure 3:
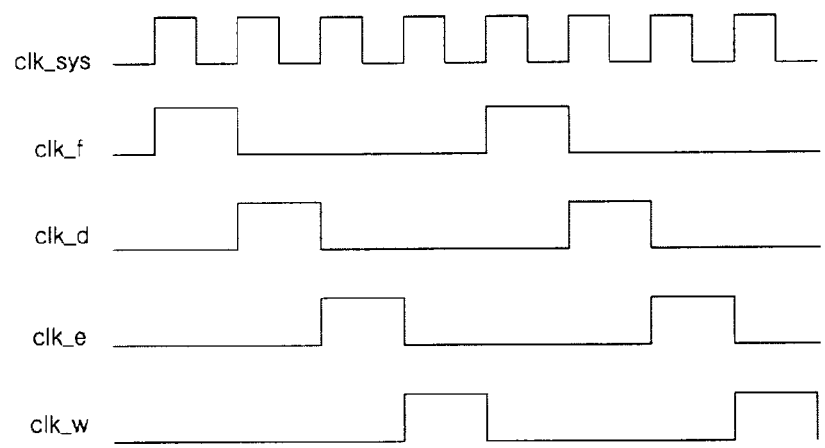
FIG. 3 is a timing diagram for explaining an operation of the clock generator shown in FIG. 2.

Waveforms of the clocks generated by the configuration can be confirmed through FIG. 3. Each of the fetch clock 'clk_f', the decoding clock 'clk_d', the execution clock 'clk_e', and the write-back clock 'clk_w' each has an enable period corresponding to one cycle of the system clock 'clk_sys'. The clocks are implemented as forms of pulse signals that are sequentially enabled.

Meanwhile, the oscillator 510 is activated in response to the initial operation end signal 'ini_end'. Since the clock generator 50 does not need to be activated while the data dumping device 30 transmits the program data 'd_pgm' to the volatile memory device 70, the oscillator 510 is activated in response to the initial operation end signal 'ini_end' not the power on reset signal 'pwrst'. Referring to FIG. 1, in addition to the clock generator 50, it can be derived that the command decoder 80, the arithmetic device 90, and the peripheral circuit device 110 also have configurations activated by the initial operation end signal 'ini_end', not the power on reset signal 'pwrst'. As such, the micro-processor implemented by the embodiment can suppress unnecessary current consumption by using the initial operation end signal 'ini_end'.

Figure 4:
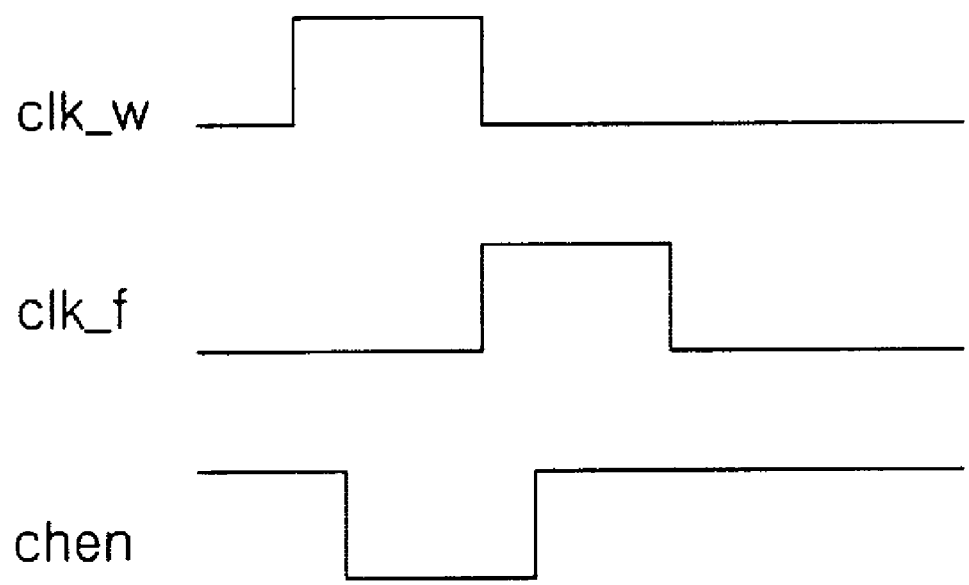
FIG. 4 is a timing diagram for explaining an operation of an enable controller shown in FIG. 1.

The volatile memory device 70 is activated in response to the chip enable signal 'chen'. The chip enable signal 'chen' is implemented as a low enable signal and is generated by inverting and delaying the write-back clock 'clk_w' by the enable controller 60. The volatile memory device 70 is activated when the chip enable signal 'chen' is enabled and enters an idle mode to reduce current consumption when the chip enable signal 'chen' is disabled. The output operation of the program data 'd_pgm' of the volatile memory device 70 is performed according to the control of the fetch clock 'clk_f'. As such, consumption of power by the volatile memory device 70 is reduced by using the chip enable signal 'chen' and the fetch clock 'clk_f'. In order to more easily understand the operation of the volatile memory device 70, the waveforms of the write-back clock 'clk_w', the fetch clock 'clk_f', and the chip enable signal 'chen' are shown in FIG. 4.

As described above, the micro-processor of the present invention generates the four clocks that are sequentially enabled and activates the operation of each circuit area using the clocks, thereby reducing current consumed in a period that are actually not operated to improve power efficiency. In addition, the low-power and high-speed micro-processor can be implemented using the volatile memory device and each circuit area is not activated while the program data is transmitted to the volatile memory device at the initial operation to suppress a flow of unnecessary current. And, in a period where the volatile memory device does not need to be activated, the volatile memory device enters the idle mode, thereby reducing the amount of current consumed by the volatile memory device. As described above, the present invention remarkably reduces current consumption, thereby implementing a high-quality micro-processor suitable for the low-power and high-speed environment.

While certain embodiments have been described above, it will be understood that the embodiments described are by way of example only. Accordingly, the device and method described herein should not be limited based on the described embodiments. Rather, the devices and methods described herein should only be limited in light of the claims that follow when taken in conjunction with the above description and accompanying drawings.

What is claimed is:

1. A micro-processor, comprising:
    a volatile memory device is configured to output program data in response to a fetch clock;
    a clock generator configured to generate the fetch clock, a decoding clock, an execution clock, and a write-back clock that are enabled sequentially in response to an initial operation end signal which is generated after program data stored in a non-volatile memory device is transmitted to the volatile memory device;
    a command decoder configured to receive the program data and to decode the program data in response to the decoding clock to generate a decoding command;
    an arithmetic device configured to perform an arithmetic operation on the decoded program data according to the decoding command in response to the execution clock; and
    a peripheral circuit device configured to receive an output from the arithmetic device and perform a given operation according to the decoding command in response to the write-back clock.

2. The micro-processor of claim 1, wherein the clock generator includes:
    an oscillator configured to perform an oscillating operation in response to the initial operation end signal to generate a system clock; and
    a shifter configured to shift a rising edge of the system clock to sequentially enable the fetch clock, the decoding clock, the execution clock, and the write-back clock.

3. The micro-processor of claim 2, wherein one enable period of each of the fetch clock, the decoding clock, the execution clock, and the write-back clock corresponds to one cycle of the system clock.

4. The micro-processor of claim 1, the micro-processor further comprising an enable controller configured to invert and delay the write-back clock to generate a chip enable signal.

5. The micro-processor of claim 4, wherein the volatile memory device is configured to be activated when the chip enable signal is enabled and to enter an idle mode when the chip enable signal is disabled.

6. The micro-processor of claim 1, the micro-processor further comprising:
    a program input device configured to store the program data received from a user and then output the program data when a power on reset signal is enabled; and
    a data dumping device configured to sequentially transmit the program data from the non-volatile memory device to the volatile memory device,
    wherein the non-volatile memory device is configured to sequentially store the program data in a given address and then sequentially output the program data.

7. A micro-processor comprising:
    a volatile memory device configured to be activated in response to a chip enable signal and output program data when a fetch clock is enabled;
    a clock generator configured to generate the fetch clock, a decoding clock, an execution clock, and a write-back clock that are enabled sequentially in response to an initial operation end signal which is generated after the program data pre-stored in a non-volatile memory device is transmitted to a volatile memory device;
    an enable controller configured to generate the chip enable signal using the write-back clock; and
    a command decoder configured to decode the program data in response to the decoding clock.

8. The micro-processor of claim 7, wherein the clock generator includes:
    an oscillator configured to perform an oscillating operation in response to the initial operation end signal to generate a system clock; and
    a shifter configured to shift a rising edge of the system clock to sequentially enable the fetch clock, the decoding clock, the execution clock, and the write-back clock.

9. The micro-processor of claim 7, wherein the volatile memory device is configured to be activated when the chip enable signal is enabled and to enter an idle mode when the chip enable signal is disabled.

10. The micro-processor of claim 7, the micro-processor further comprising:
    an arithmetic device configured to perform an arithmetic operation according to a command signal output from the command decoder in response to the execution clock; and
    a peripheral circuit device configured to perform storage, counting, and communication operations according to the command signal in response to the write-back clock.

11. The micro-processor of claim 10, the micro-processor further comprising:
    a program input device configured to store the program data received from a user and then output the program data when a power on reset signal is enabled; and a data dumping device configured to sequentially transmit the program data output from the non-volatile memory device to the volatile memory device, wherein the non-volatile memory device is configured to sequentially store the program data in an address and then sequentially output the program data to the data dumping device.

12. A micro-processor comprising:

a data dumping device configured to transmit program data, which is stored in a non-volatile memory device, to a volatile memory device in response to a power on reset signal and enable an initial operation end signal when the transmission operation ends;

a command decoder configured to generate a decoding command by decoding the program data transmitted from the volatile memory device when the initial operation end signal is enabled;

an arithmetic device configured to perform an arithmetic operation according to the decoding command when the initial operation end signal is enabled; and a peripheral circuit device configured perform an operation according to the decoding command when the initial operation end signal is enabled.

13. The micro-processor of claim 12, the micro-processor further comprising a clock generator configured to (i) sequentially generate a fetch clock, a decoding clock, an execution clock, and a write-back clock that are sequentially enabled, and (ii) transmit the fetch clock, the decoding clock, the execution clock, and the write-back clock to the volatile memory device, the command decoder, the arithmetic device, and the peripheral circuit device, respectively.

14. The micro-processor of claim 13, wherein the clock generator includes:

an oscillator configured to perform an oscillating operation in response to the initial operation end signal to generate a system clock; and a shifter configured to shift a rising edge of the system clock to sequentially enable the fetch clock, the decoding clock, the execution clock, and the write-back clock.

15. The micro-processor of claim 13, the micro-processor further comprising an enable controller configured to delay the write-back clock to generate a chip enable signal.

16. The micro-processor of claim 15, wherein the volatile memory device is configured to be activated when the chip enable signal is enabled and to enter an idle mode when the chip enable signal is disabled.

* * * * *